United States Patent
Riemann et al.

(10) Patent No.: US 6,735,208 B1
(45) Date of Patent: *May 11, 2004

(54) LAN TELEPHONE SYSTEM

(75) Inventors: Ernst B. Riemann, Libertyville, IL (US); Alan T. Weir, Gurnee, IL (US); Randall Vyskocil, Buffalo Grove, IL (US); David F. Niesman, Buffalo Grove, IL (US); M. A. Kergozou, Surrey (GB)

(73) Assignee: Sphere Communications, Inc., Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/260,993

(22) Filed: Mar. 1, 1999

Related U.S. Application Data (63) Continuation of application No. 08/714,565, filed on Sep. 16, 1996, now Pat. No. 5,892,764.

(51) Int. Cl.[7] .............................................. H04L 12/56
(52) U.S. Cl. ................................. 370/401; 370/395.1
(58) Field of Search ................................ 370/236, 360, 370/395, 463, 466, 467, 401

(56) References Cited

U.S. PATENT DOCUMENTS

| | | | |
|---|---|---|---|
| 4,843,606 A | 6/1989 | Bux et al. ................. 370/89 |
| 4,886,704 A | 12/1989 | Kamada et al. ............ 428/323 |
| 5,341,374 A | 8/1994 | Lewen et al. ............. 370/85.4 |
| 5,428,608 A | 6/1995 | Freeman et al. ........... 370/60.1 |
| 5,526,353 A | * 6/1996 | Henley et al. ............. 370/392 |
| 5,533,018 A | 7/1996 | DeJager et al. ............ 370/60.1 |
| 5,541,917 A | 7/1996 | Farris ...................... 370/60.1 |
| 5,541,981 A | * 7/1996 | Lynn ........................ 379/67 |
| 5,604,737 A | 2/1997 | Iwami et al. .............. 370/352 |
| 5,623,494 A | * 4/1997 | Rostoker et al. ........... 370/397 |
| 5,623,540 A | * 4/1997 | Morrison et al. ........... 379/115 |
| 5,694,548 A | * 12/1997 | Baugher et al. ............ 709/227 |
| 5,742,596 A | * 4/1998 | Baratz et al. .............. 370/356 |
| 5,784,377 A | * 7/1998 | Baydar et al. ............. 370/463 |
| 5,838,683 A | 11/1998 | Corley et al. ............. 370/408 |
| 5,892,764 A | * 4/1999 | Riemann et al. ........... 370/401 |
| 5,933,607 A | * 8/1999 | Tate et al. ............... 395/200.7 |
| 5,953,350 A | * 9/1999 | Higgins .................... 370/524 |
| 6,125,284 A | * 9/2000 | Moore et al. .............. 455/557 |

FOREIGN PATENT DOCUMENTS

| | | |
|---|---|---|
| EP | 0696124 | 2/1996 |
| EP | 0711052 | 5/1996 |

OTHER PUBLICATIONS

"IDSN PBX for the International Market", by Shimada, et al., Fujitsu Science Tech. pp1920205 (6/92).

"Integrated Corporate Communication Platform for Multimedia Networking" by Shimuzu, et al., International Switching Symposium, (10/92).

(List continued on next page.)

Primary Examiner—Alpus H. Hsu
Assistant Examiner—Toan D. Nguyen
(74) Attorney, Agent, or Firm—Much Shelist Freed (57) ABSTRACT

A distributed private branch telephone exchange (PBX) including a local area network carrying telephony traffic, an interface to the PSTN and a station interface connecting to a telephone device transmitting telephony over the local area network. The distributed PBX may contain a number of multi-port modules connected over a local area data network. The multi-port modules convert between synchronous and asynchronous signals and connect between a telephony environment, such as a telephone device, a local area network, and a personal computing device. The distributed PBX also includes PBX software and a graphical user interface (GUI) which facilitate the management of various PBX functions.

15 Claims, 8 Drawing Sheets

OTHER PUBLICATIONS

"IP and ATM Integration Perspectives", by Guarene, et al.; IEEE Communications Magazine (Jan. 1998).

"Le Matracom 6500: evolution vers les hauts debits", by M. Fouques; Matra Communicaion (1993).

LeMatracom 6500:evolution vers les hauts debits; pp. 43–48; M. Fouques.

IP and ATM Integration Persectives, pp. 74–80; Eugenio Guaraene, et al.

* cited by examiner

FIG. 1
LAN TELEPHONE SYSTEM

FIG.6
MULTI-PORT PSTN MODULE CONTROL LOGIC

FIG. 9 OPERATOR CONSOLE / TELEPHONE ASSISTANT GUI

LAN TELEPHONE SYSTEM

This application is a continuation of application Ser. No. 08/714,565, filed Sep. 16, 1996, now U.S. Pat. No. 5,892,764.

BACKGROUND OF THE INVENTION

The present invention relates in general to telephone voice communication networks, more particularly, it relates to an local area computer network capable of delivering telephone services.

A typical modern office building provides each worker with their own telephone. Rather than purchasing all the required telephone lines from the local telephone company, most offices have established their own private telephone networks. The private telephone network can handle calls originating and terminating within the building without going through the public switched telephone network (PSTN) provided by the telephone companies. Thus, an office building need only purchase a smaller number of access lines or trunks to connect its private telephone network to the PSTN. Such private telephone networks are commonly known as Private Branch Exchanges (PBXs).

In addition to a PBX, a modern office typically has a number of personal computers (PCs) connected by a local area network (LAN). The PC LAN connects together the PCs in the office to share data, printers or other computer peripheral hardware. Although many different PC LAN configurations are possible, each PC on the network is typically connected via a connecting medium to one or more central hubs or switches which allow communication between network nodes. A primary computer or file server typically stores a large quantity of data and implements a data transmission control protocol to arbitrate the distribution of data over the network.

Traditionally, LANs and PBXs have served different functions and have been developed as independent systems. For example, a typical Ethernet LAN simultaneously broadcasts digital data across a shared common bus to all network destinations at data rates up to ten million bits per second (Mbps). Because of the broadcast transport scheme of Ethernet LANs, a number of devices on the network may transmit data simultaneously. Network transmissions are therefore subject to collisions which require the data to be retransmitted. In contrast, a PBX establishes separate dedicated point-to-point connections which are typically operated at lower data rates of only tens of thousand-bits per second (Kbps). Moreover, PBXs must handle the telephony supervision and signaling functions required to interface with the PSTN, and to handle calls within the local telephone network. The real-time event handling and audio distribution required to implement real-time telephony functions are generally inconsistent with the architecture of LANs.

Attempts to integrate PBXs and LANs have been unsuccessful partly due to the increased cost of building a single system which meets the requirements of both networks. In addition to the cost, the functionality and performance of the integrated system is often compromised when compared to separate dedicated systems. For example, providing a PBX with the increased data capacity required by LANs have prohibitively increased the cost of the PBX without delivering the performance provided by dedicated LANs.

A typical office today thus uses two separate and independent networks: a PC LAN to distribute computer data, and a PBX to provide telephone services. The hardware infrastructure of the two networks is independent and separate. Each network requires its own dedicated physical connection medium such as coaxial cable, twisted pair wiring, etc. Traditionally, PBX switching equipment, terminal equipment, control computer resources and in-house wiring are separate devices, not shared or leveraged by the two networks.

The term computer telephone integration (CTI) describes any system which employs a computer to enhance or control telephony. This is implemented by interfacing PBXs and computers, bringing caller information to the computer so database lookup and screen pops to the called agent are possible. Other implementations utilize separate servers with new buses to add voice processing capability. Recently, CTI developers have developed equipment which, when added to a standard PC, allows the functions of a PBX to be implemented. The same PC which operates on the LAN may now also be used to implement the PBX.

Despite the integration afforded by CTI, artifacts of the different development of PBXs and LANs remain. Although the PBX and LAN may be implemented by a standard PC, and may even physically reside within the same device, the two networks remain separate and independent systems. The LAN continues to use its own data transport protocol and physical connection media to each device on the network. The PBX uses its telephony signaling scheme, switching equipment, and separate dedicated physical connection media to transmit voice data.

More recently, ATM (asynchronous transfer mode) networks have been envisioned to integrate digital data with multimedia voice and video onto a single high speed line or "pipe". ATM packages and transmits digital data in small 53 byte fixed-length messages or cells while providing high bandwidths of 25 Mbps and higher. Although ATM networks were envisaged to provide transport of data, voice and video, little has been done to facilitate the transmission of real-time, low latency voice traffic on ATM local area networks. ATM voice transmission efforts to date have primarily been focused on higher-capacity wide area networks, campus backbones and longer haul transmission networks.

The ATM forum has developed ATM standards for local area networks. A great strength of ATM is the ability of the network to assign an appropriate quality of service (QoS) class to a particular transmission. ATM networks can guarantee that strict requirements on available bandwidth and minimal delay can be guaranteed for those connections requiring predictable service. This makes reliable voice transmission possible over an ATM network. Although the bandwidth requirements for voice are easily met by other local area networking technologies, ATM can today provide the predictable quality of service required for real-time bi-directional communication.

SUMMARY OF THE INVENTION

The present invention uses CTI to implement a distributed private branch telephone exchange (PBX) over a local area computer network or LAN. The system leverages the power of desktop PC's through graphical user interfaces (GUIs) and standard interfaces such as Object Linking and Embedding (OLE) to simplify and extend conventional telephony. The LAN telephone system includes a unique multi-port station module in each desktop client computer that provides both the network data interface and an interface to a standard telephone set. Quality voice transmission is achieved by the use of real-time voice streaming, which directly converts digitized voice to cells ready for transmission over the asynchronous network or for local storage on the computer hard drive for later playback.

A different network module (or modules in larger systems) plugs into the network server. This PSTN module 20 interfaces the LAN telephone system to outside trunk lines provided by the local telephone company. It combines telephone trunk interfaces with digital signal processing for caller ID, DTMF and call progress detection, and real-time voice streaming to facilitate transmission of voice within the LAN.

The desktop client computers are linked to each other and the server through an ATM switch, which transmits network traffic using the conventional ATM protocols as defined in ATM Forum standards. Using the unique adapter modules described in this patent allows the network to support not only conventional ATM traffic, but also the transport of high quality voice transmission, and the conversion of voice information from analog or digital signals to ATM cells and back.

Another component of the system is the telephone hub, which allow the use of telephones not associated with computers; for example, telephones on a production floor, or in conference rooms. In the preferred embodiment, this device connects the hub to the network via a LAN connection, and allows connection to eight or more telephones.

The system includes software that uses this unique voice-enabled LAN to implement a distributed PBX that controls the initiation and termination of telephone calls between telephone handsets attached to client PC's, to telephone hubs, and via outside trunk connections to the PSTN. This PBX differs from previous implementations in that a standard ATM LAN has been used to replace the usual backplane connection between trunk and station line interfaces, and that voice transmissions are carried over the came set of wires as LAN data. Conventional PBX signaling between trunk and station, or station and station, has been translated into network messages that convey information relating to real-time telephony events on the network, or instructions to the network adapters to generate the appropriate signals and behavior to support normal voice communication, or instructions to connect voice media streams using standard ATM connection and signaling protocols.

The control software of the PBX runs on one computer on the network, usually the server, (or servers in large systems), and includes a network telephony services provider. Telephony applications, including voice mail, auto attendant, CTI applications, a client Telephone Assistant graphical user interface (GUI), configuration and administration GUIs, and an operator console GUI are implemented on the network of server and client computers.

DETAILED DESCRIPTION OF THE DRAWINGS

ATM LAN Telephone Network

Figure 1:
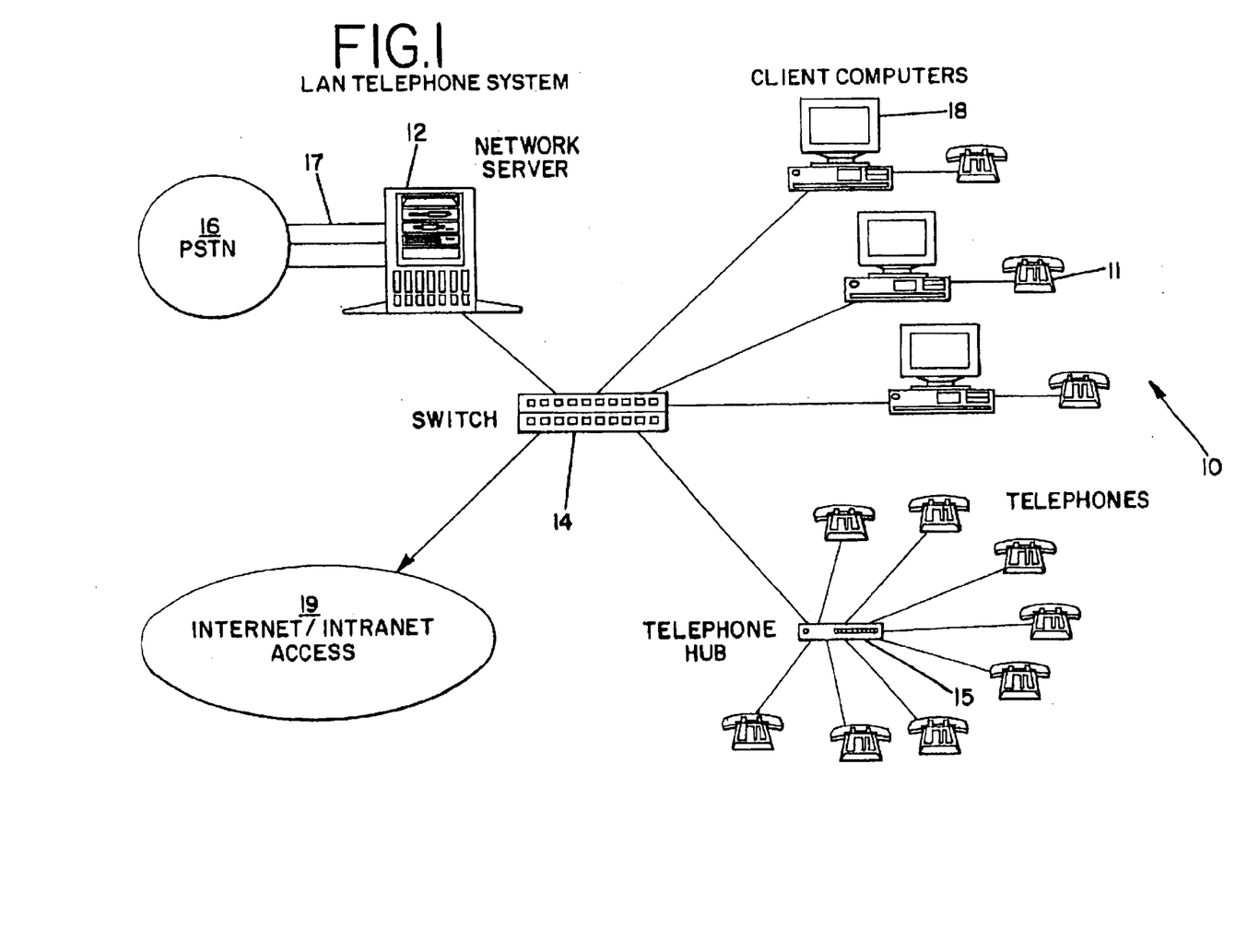
FIG. 1 is diagram of an embodiment of the telephone network of the present invention.

Referring now to the drawings, FIG. 1 illustrates a local area telephone network or distributed private branch exchange (PBX) 10 of the present invention. A network communications server 12 provides a PSTN interface between the public switched telephone network (PSTN) 16 or wide area network (WAN) and an asynchronous transfer mode (ATM) network switch 14. Although the present embodiment is illustrated with an asynchronous transfer mode network (ATM) it should be understood that the present invention may be implemented with other types of networks such as an Ethernet network or a Cells in Frames Ethernet network. Telephony network server 12 is equipped to provide the ATM LAN telephone network 10 with the telephony functions of a PBX, as will be described in more detail hereinafter. ATM network switch 14 switches network messages via the transmission of ATM cells containing computer data, network supervision, signaling and a variety of different media streams between the telephony network server 12 and the client PCs 18 equipped with telephone stations 11. The media streams may include multimedia images, video, or audio voice telephone traffic.

Telephony network server 12 and client computers 18 preferably consists of a general purpose computer such as an IBM compatible personal computer (PC). They could also consist of Sun Workstations, DEC Alpha computers, or other server and desktop PCs or workstation computers.

A typical network server computer includes a high-speed Intel Pentium class or faster processor, or a high-speed reduced instruction set computer (RISC) such as the Digital Equipment Corporation (DEC) Alpha processor. The server typically uses 64 Mbytes of random access memory (RAM) or more, and has at least several gigabytes of hard disk storage capacity. Additional storage devices typically include removable floppy or tape drives, and a CDROM compact disk drive. The server may include a keyboard and a mouse for control purposes, and an attached graphic monitor for observation of software operation. The server typically incorporates fast disk drive technology such as Fast Wide SCSI 2, and may incorporate redundant hot swappable power supplies and other hardware innovations to increase reliability.

Telephony network server 12 incorporates the PBX software 85 which handles the supervision, signaling and setup of telephone calls. This software monitors the status of all telephone clients 11 in real-time on the network and responds to telephony events in a timely manner to provide conventional telephone service. This includes control of the generation of the conventional signaling tones such as dial tone, busy tone, ring back tone and so on, as well as the connection and termination of media streams between telephones on the LAN. The PBX software 85 uses the multi-port modules, the ATM LAN and PCs to implement standard PBX functions such as the initiation and termination of telephone calls, either across the network or to outside trunk lines 17, the ability to put calls on hold, to transfer, park and pick up calls, to conference multiple callers, and to provide caller ID information. Telephony applications such as voice mail and auto attendant are implemented by applications software using the PBX as a network telephony services provider.

Referring to FIG. 1, the network switch 14 is connected to the telephony network server 12 and each of the client PCs 18 with standard UTP-3 wiring. The wiring between the network switch 14 and each of the client PCs 18 carries both the LAN computer data, the telephony supervision and signaling messages, and the various media streams. Specifications for the connectors, the cable, and the pin assignments used are defined in ATM Forum specifications.

Network switch 14 is preferably an ATM-25 network switch transmitting data at 25 Mbps. The switch contains an optional ATM-155 interface for connecting to higher speed backbone ATM networks. A suitable ATM network switch supports from 4 to 24 or more ports. Multiple ATM network switches can be stacked for increased port capacity. Selected ports can accommodate Ethernet connections for LAN-based printers or other legacy hardware peripherals. ATM network switches are currently available from several manufacturers such as ago ATM, Ltd. An example of an ATM network switch suitable for use with the present invention is the ATM Ltd. Virata Switch. The Virata Switch is a 24 port ATM-25switch.

The client PC 18 is preferably a general purpose computer such as a standard IBM compatible PC. It preferably includes an Intel 486 or Pentium or faster processor. The client uses at least 8 and preferably 16 Mbytes of general purpose RAM, and has at typically 500 megabytes or more of hard disk storage capacity. Additional storage devices typically include removable floppy or tape drives, and a CDROM compact disk drive. The client includes a keyboard and a mouse for control purposes, and an attached graphic monitor for observation of software operation.

Multi-Port PSTN Module

Figure 2:
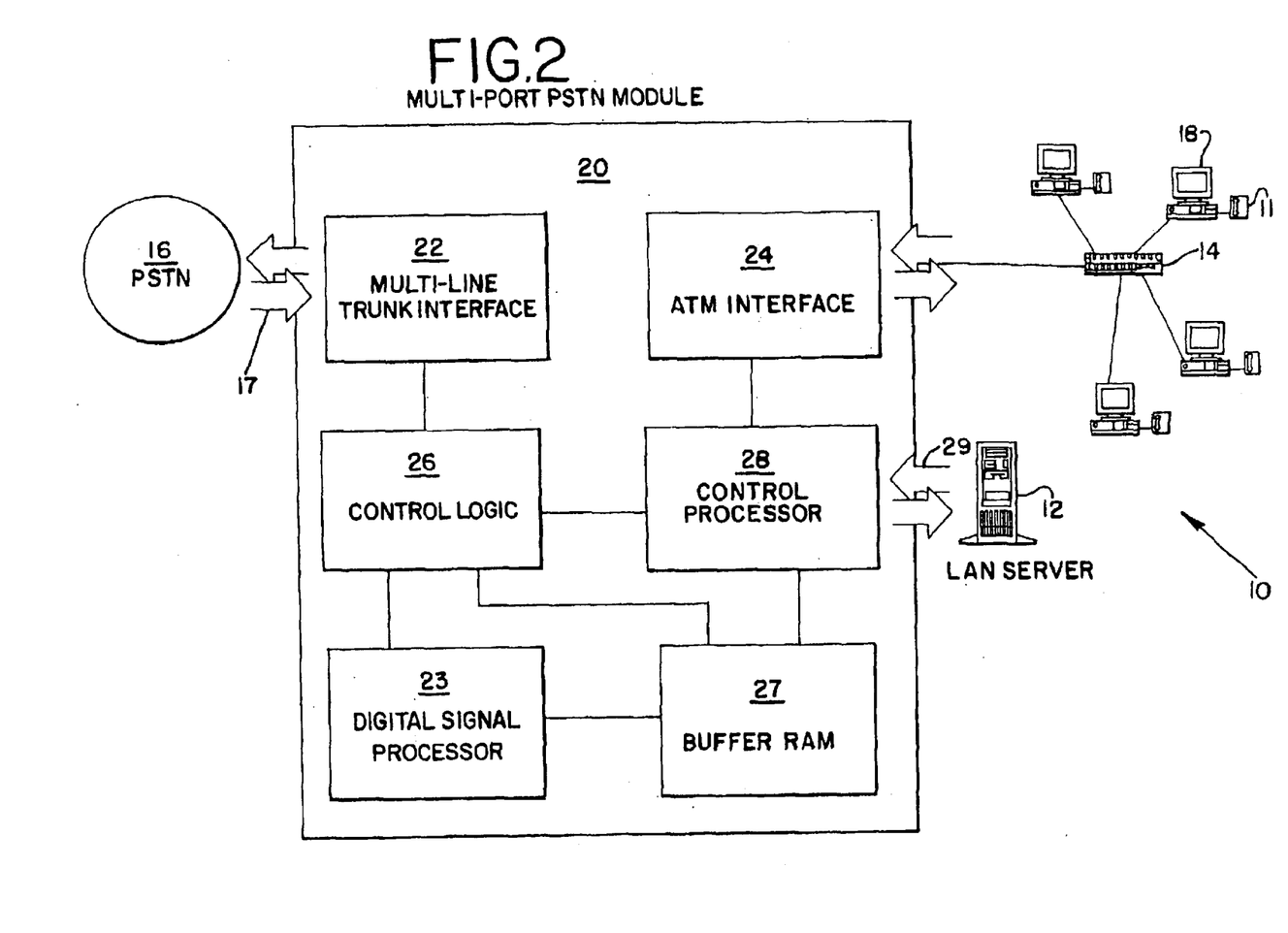
FIG. 2 shows a diagram of the multi-port PSTN module of the telephone network of FIG. 1.

Referring to FIG. 2, telephony network server 12 is equipped with multi-port PSTN module 20 having circuitry and software to implement a trunk interface 22, an ATM network interface 24, and buffer storage RAM 27 with control logic 26 to convert media streams between the trunk interface 22 and ATM network switch 14. Trunk interface 22 provides interconnection with the trunk circuits 17 of the PSTN 16. ATM network interface 24 provides conventional software and circuitry to enable the telephony network server 12 to access the ATM LAN 20. The buffer RAM 27 and control logic 26 implement the efficient transfer of media streams between the trunk interface 22, the telephony network server 12, the digital signal processor 23, and the ATM network interface 24, as will be described in more detail hereinafter.

The trunk interface 22,implements conventional telephony trunk transmission supervision and signaling protocols required to interface with the outside trunk circuits 17 from the PSTN 16. Trunk circuits 17 carry various types of telephony signals such as transmission supervision and signaling, and audio voice, fax, or modem data to provide plain old telephone service (POTS). In addition, the trunk circuits 17 may carry other communication formats such T1, ISDN or fiber service to provide telephony or multimedia data images, video, text or audio. In the preferred embodiment, the trunk interface 22 provides access to 16 or more POTS trunk circuits.

The ATM network interface 24 preferably includes conventional circuitry to interface with the ATM line conforming to the ATM forum UNI 3.1 and LAN Emulation (LANE) specifications. An example of a suitable ATM interface is available from ATM, LTD. (ATML) located in Cambridge, England with sales offices in Sunnyvale, Calif. ATML's network interface includes the ATM interface circuitry and an advanced RISC machine (ARM) processor.

The ARM control processor 28 is programmed to oversee the transmission and reception of ATM cells between the ATM network switch 14 and the telephony network server 12. The ARM control processor 28 is also capable of directing network messages between the ATM network switch 14, the telephony network server 12, and sending the media content of messages to the trunk interface 22. In the preferred implementation, the network uses Transmission Control Protocol/Internet Protocol (TCP/IP). The network messages contain computer data, telephony transmission supervision, signaling and various media streams. The control processor 28 directs network messages containing computer data from the ATM network switch 14 to the telephony network server 12 directly through the multi-port PSTN module 20 PC bus 29.

The control processor 28 manages real-time telephony event handling pertaining to the telephone trunk line interfaces. It manages the efficient use of DSP 23 resources for the detection of caller ID, DTMF, call progress and other conventional forms of signaling found on trunk lines. In the preferred embodiment, the digital signal processor 23 is a Texas Instruments TMS320C50 or similar processor chip using standard telephony digital signal processing software algorithms from HotHaus Technologies, of Richmond, British Columbia, Canada. The control processor 28 also manages the generation of telephony tones for dialing and other purposes, and controls the connection state, impedance matching, and echo cancellation of individual trunk line interfaces 22 on the multi-port PSTN module 20.

Additionally, the control processor 28 manages the re-direction of media streams from incoming trunk lines 17 to client computers 18 via the ATM network, or directly to and from the server hard disk drive for storage and later playback, allowing voice mail and auto attendant functionality to be implemented. These media streams can be sent directly to an outside caller attached to a trunk line 17, or across the network for voice playback at the networked client telephones 11.

The control processor 28 also manages the connection of multiple media streams to the DSP 23 so they can be combined for conferencing between multiple callers connected to the system, either on the LAN or to PSTN lines 17.

All these telephony functions are ultimately controlled by the PBX software, which communicates with the control processor 28 using a sockets-based programming interface to a standard protocol such as TCP/IP. Messages are sent from the control processor 28 across the network to notify the PBX software 85 in the server 12 of real-time telephony events on the attached trunk lines 17, and messages are received from the PBX to implement telephone call supervision. Some of these messages control the set-up and elimination of media streams for voice transmission.

PBX trunk control messages are sent directly from the host processor in the server 12 across the PC bus 29 to the multi-port PSTN control processor 28. In contrast, network messages containing media streams of digital representations of real-time voice are transmitted between the trunk interface 22 and the ATM network switch 14 using the digital signal processor 23, buffer RAM 27 and control logic 26. The buffer RAM 27 and control logic 26 implement a first-in-first-out (FIFO) data buffering scheme for transmitting digital representations of voice audio between the Asynchronous Transfer Mode (ATM) network to the synchronous trunk interface. The operation of the buffering scheme to implement real-time voice streaming will be described in further detail hereinafter.

Returning to FIG. 1, a primary function of network server 12 is to interface between the trunk circuits from the PSTN 16 and the ATM network switch 14. For example, telephony network server 12 packages the various types of synchronous telephony signals carried by the trunk circuits 17 into the asynchronous standard 53-byte fixed-length cell format transmitted by the ATM interface 24 to the ATM network switch 14.

Multi-Port Station Module

Figure 3:
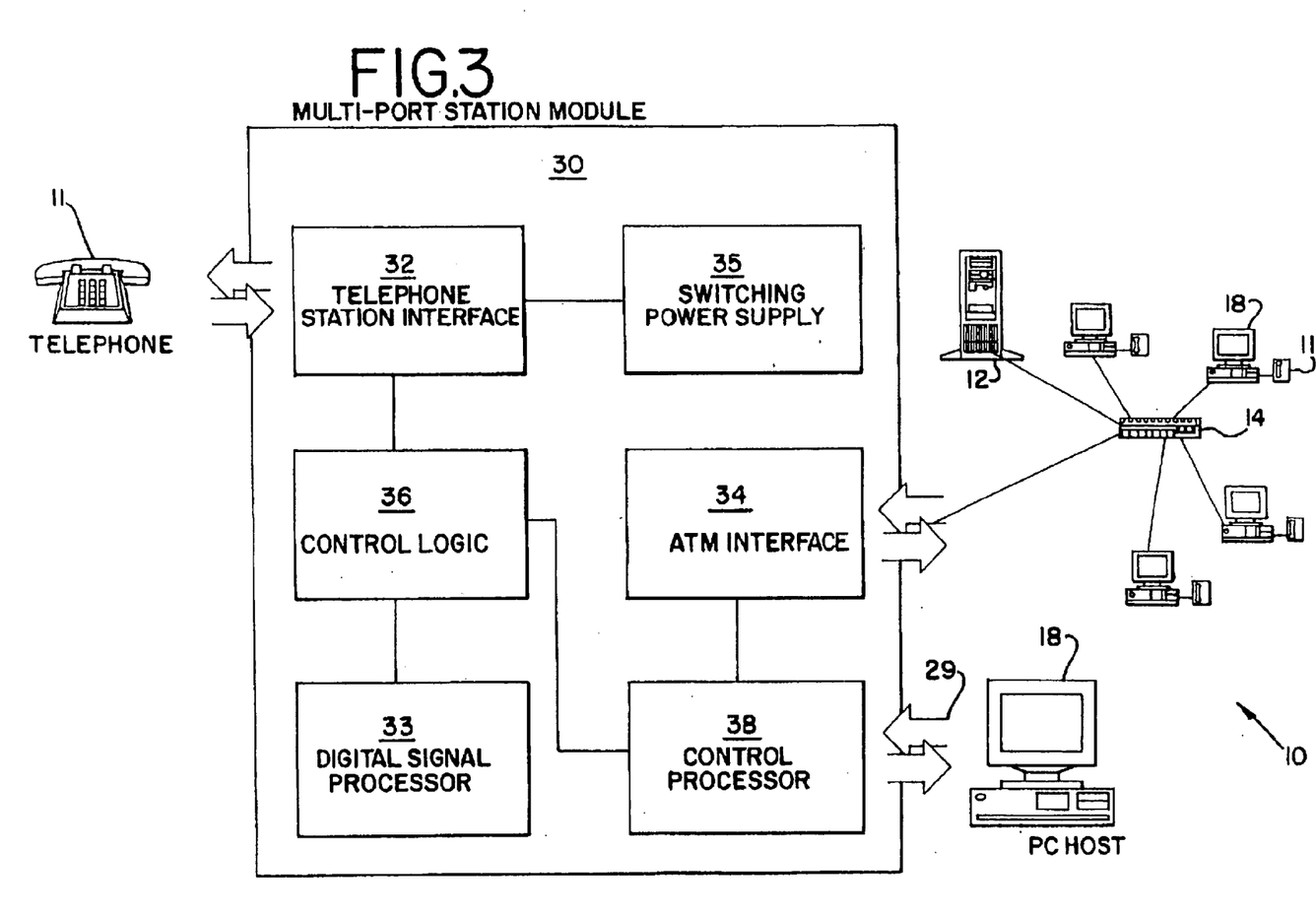
FIG. 3 shows a diagram of the multi-port station module of the telephone network of FIG. 1.

Referring to FIG. 3, client PC 18 is equipped with multi-port station module 30 having an ATM network interface 34, a conventional telephone station interface 32 and a digital signal processor (DSP) 33 and control logic 36. This hardware can generate desired telephony tones by the programming the appropriate algorithms into the digital signal processing 33—for example, dial tone and ring back tone. In addition, the multi-port station module 30 is capable of detecting and decoding tones generated by the attached telephone such as DTMF digits for dialing. The multi-port station module 30 includes a small switching power supply 35 to generate voltages sufficient to simulate Central Office (CO) battery and ringing line conditions.

The ATM network interface 34 allows client PC 18 access to the ATM LAN through conventional circuitry and software. Telephone line interface 32 converts digitized voice and tone signals to analog, and provides a conventional POTS interface with CO battery and ringing voltages to a standard 2500 telephone set connected via a standard RJ-11 telephone connection.

Control logic 36 facilitates the transfer of data between ATM network interface 34, client PC 18, the digital signal processor 33, and telephone line interface 32. The ATM network interface 34 preferably includes conventional electronic circuitry to interface with the ATM line, based on the ATM Forum UNI 3.1 specification. Similar to the multi-port PSTN module of the telephone network server 12, a suitable ATM interface is available from ATML. ATM network interface 34 includes the necessary ATM interface circuitry and preferably an advanced RISC machine (ARM) control processor 38. Control processor 38 is programmed to oversee the transmission and reception of ATM cells between ATM network switch 14 and client PC 18.

Control processor 38 is also capable of directing messages from ATM network switch 14 to client PC 18 or to telephone line interface 32. For example, network messages containing computer data, and/or telephony trunk supervision and signaling from the ATM network switch 14, are routed to the client PC 18 through its PC bus 29. In contrast, network messages containing media streams are transmitted between the network 10 and the telephone line interface 32 through the digital signal processor 33 and the control processor 38 RAM implementing a first-in-first-out (FIFO) buffering scheme as further described hereinafter. Because only a few media streams need to be handled by the client computer 18, the FIFO buffering scheme can be implemented internally in the control processor with software using available memory.

The control processor 38 manages real-time telephony event handling pertaining to the telephone station interface. It controls the ringing of the telephone 11 and manages the efficient use of digital signal processor 33 resources for the detection of DTMF digits dialed by the connected telephone 11, and the generation of standard telephone signaling tones such as dial tone, busy tone and ring back tone. In the preferred implementation, the digital signal processor used is a Texas Instruments TMS320C50 or similar processor chip, and standard telephony digital signal processing software algorithms from HotHaus Technologies, of Richmond, British Columbia, Canada, are used.

The control processor 38 also manages the redirection of media streams from the telephone 11 to other client computers 18 on the ATM network, or to the PSTN module 20 for connection to trunk lines 17, or media streams directly to and from the client hard disk drive for storage and later playback, or directly to and from the server hard disk drive across the network for storage and later playback. Additionally, the control processor 38 manages the connection of multiple media streams to the digital signal processor 33 so they can be combined for conferencing between multiple callers.

All these functions are ultimately controlled by the PBX software in the server 12, which communicates with the control processor using a sockets-based programming interface to a standard protocol such as TCP/IP. Messages are sent across the network to notify the PBX of real-time telephony events pertaining to the use of the telephone 11, such as an off-hook condition or dialing. In response, messages are received from the PBX to implement telephone call supervision. Some of these messages control the set-up and tear down of media connections for voice transmission.

Telephone Hub

Figure 4:
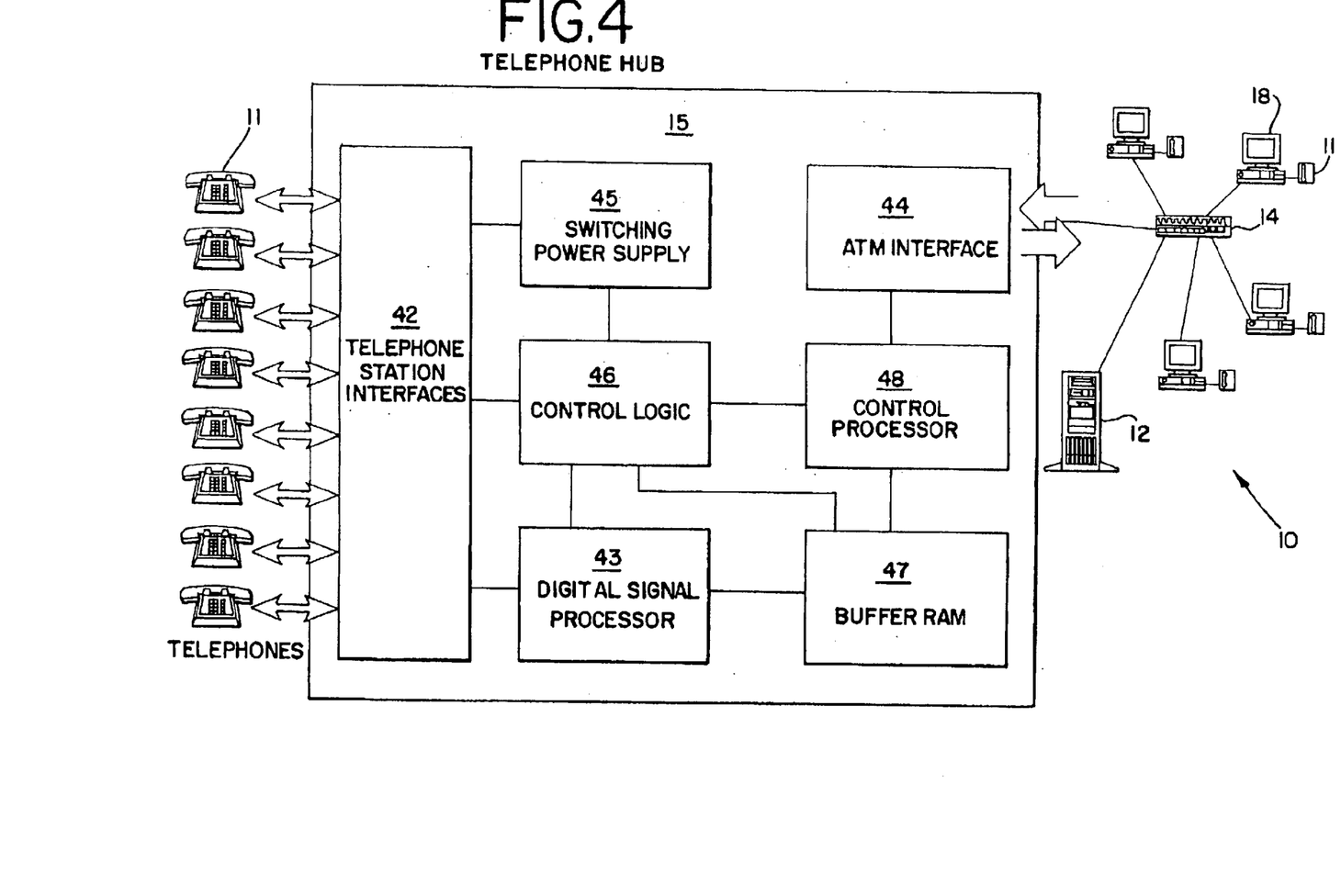
FIG. 4 shows a block diagram of the telephony hub with 8 telephones.

FIG. 4 is a block diagram of the telephone hub 15. This device allows telephones 11 not associated with PCs to connect to the network 10. In the preferred implementation, the device contains an 8 telephone station interface 42. Operation is very similar to the PSTN module 20 described above, except that multiple telephone station interfaces are used, rather than multiple trunk line interfaces. For example, ATM interface 44, buffer RAM 47, and control processor 48 perform similar telephony functions as the ATM interface 34, buffer RAM 37, and control processor 38 discussed in the station module 30 description. In the preferred implementation, a switching power supply 45 capable of supplying 8 telephones with CO battery and ringing voltages is used. The operation of real-time voice streaming is very similar to the PSTN module 20, which also services multiple voice circuits.

Voice Streaming and Direction

Figure 5:
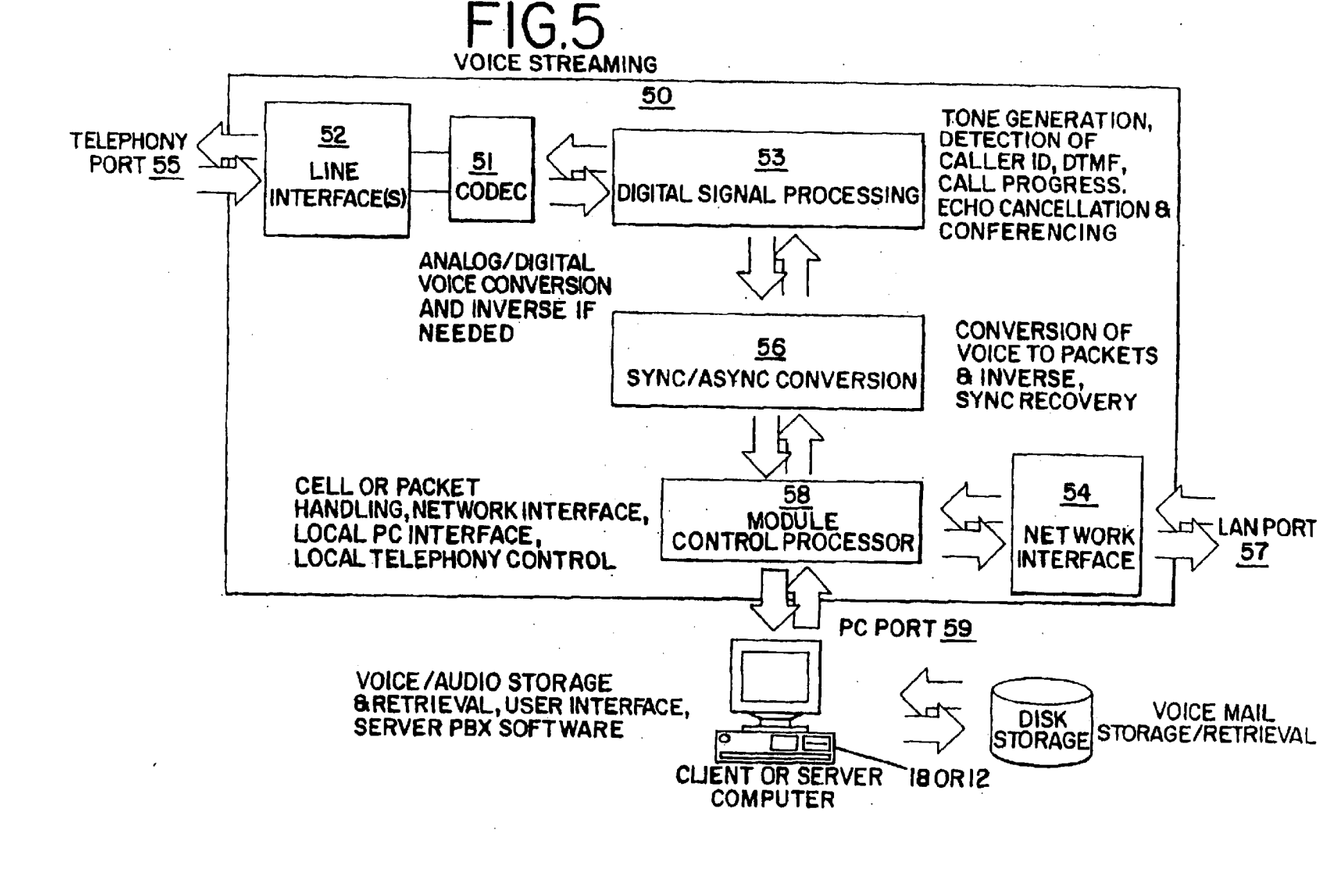
FIG. 5 illustrates real-time voice streaming performed by the telephone network of FIG. 1.

FIG. 5 illustrates the voice streaming and redirection functions performed by a multi-port module 50 such as the PSTN module 20, the station module 30, and the telephone hub 15. For example, at telephony port 55, either analog or digital voice signals from a telephone (in the case of a station module 30 or telephone hub 15) or from a trunk line (in the case of the PSTN module 20) are transmitted through a line interface circuit 52. From the line interface 52, a CODEC 51, such as a Texas Instruments TCM29C13 or a National Semiconductor TP3054 changes the analog voice signal into a standard synchronous digital form, such as pulse code modulation (PCM). For example, for 64 Kbit PCM, a new 8-bit sample of data is synchronously generated every 125 microseconds, or 8000 samples per second. It should be understood that the CODEC 51 is not used when connection is made to digital lines or devices. From the CODEC 51, the synchronous digital data is passed to the digital signal processor 53, where telephony signal detection and generation, and line management functions are performed.

The synchronous data is then passed to functional block 56 and an associated module control processor 58 to convert the synchronous data to :asynchronous form and to direct the asynchronous media stream to one of the ports. The synchronous-asynchronous conversion is performed by functional block 56 and the associated module control processor 58 by implementing first-in-first-out (FIFO) buffering of data. Functional block 56 and module control processor 58 accumulate data bytes from the synchronous data stream in a FIFO memory buffer until there is sufficient data for one network data packet to be sent. For example, in an ATM network between 32 and 48 bytes of data are stored for one ATM cell, plus one additional cell of data to help overcome timing uncertainties (jitter) inherent in transmission across the asynchronous LAN. The specific number of bytes transmitted per cell depends on tradeoffs involving network latency requirements and the synchronization method, as may be selected by one skilled in the art. When the desired number of data bytes has been collected, one packet of the asynchronous data is then transferred to the network interface 54, and asynchronously transmitted across the LAN to a remote module.

The above synchronous-asynchronous conversion may be performed by each of the multi-port modules 15, 20, 30 described in FIGS. 2, 3, and 4. The FIFO buffering may be implemented by the respective control logic 26, 36, and 46, managed by the respective control processors 28, 38 and 48. Multi-port modules requiring greater line capacity, such as the PSTN module 20 of FIG. 2, use additional high-speed buffer RAM 20 accessible to the control processor 28 and digital signal processor 23. Multi-port modules with lower throughput requirements, such as the multi-port station module 30 of FIG. 3, use only control processor 38 RAM. A more detailed discussion of the operation of these circuits and the associated control software operation is described hereinafter in conjunction with FIG. 6.

To allow bi-directional communication, functional block 56 and module control processor 58 implement a return path allowing asynchronous data streams from the LAN port 57 to be transmitted to telephony port 55 as follows. Asynchronous data streams from the LAN port 57 are received by the network interface 54 and converted from asynchronous form to synchronous by control processor 58 and functional block 56. The asynchronous/synchronous conversion of data is performed as the inverse operation of the synchronous/asynchronous conversion described above. For example, in an ATM network, asynchronous cells of data are received by functional block 56 and module control processor 58 and converted to synchronous data by the FIFO buffering scheme. The synchronous data is thus restored in appropriate form suitable for transmission through the line interface 52 to either a connected telephone 11 (as in the station module 30) or a trunk line 17 (as in the PSTN module 20), or a digital interface such as a Ti line. Synchronous data can then be transferred, for example, one byte at a time, through the digital signal processor 53 to the CODEC 51 (if used).

The total unidirectional time delay (latency) for conversion and transmission across the network and through two multi-port modules 50 is typically under 20 milliseconds in the case of an ATM network, which is consistent with high-quality voice transmission requirements. Timing synchronization across the network and the two multi-port modules is achieved either by using the 8 Khz sync broadcast capability of ATM networks, or by sending timing and sequence information with all or selected network data packets or cells, extracting that information in the other module, and using this information to re-create synchronization using conventional phase-lock loop techniques.

Module control processor 58 may also direct asynchronous data streams to a PC port 59. Asynchronous data from the PC port 59 can be accessed by a host computer such as, PC network server 12 or PC client 18 for any desired processing. For example, data from PC port 59 may be collected into larger buffers for periodic transfer to the system hard disk drive for storage, or for additional processing. The stored data can be later retrieved for playback, either through the control processor 58, FIFO buffers, DSP 53, CODEC 51 (if used) and line interface 52, or directly from the control processor 58 via the network interface circuit 54 to a another network receiver module or the LAN for storage, playback or processing.

The voice streaming circuits and software accomplish the following:

1. an interface to conventional telephony such as analog or digital telephones or conventional analog or digital telephone trunk lines
2. voice is converted from analog to digital and back (if needed),
3. voice data is converted from synchronous form such as PCM to asynchronous form such as ATM cells and back,
4. voice can be directed from the line interface to the network and back,
5. digital voice can be directed from the line interface to the local hard disk for storage, and for later retrieval, either from the line interface or from across the LAN, and
6. digital voice can be directed from the LAN to the local hard disk for storage, and for later retrieval either from across the LAN, or from the line interface connection.

The voice signal re-direction capability described above is the basis for transmitting voice across the ATM LAN 10 in the preferred embodiment, and also for applications such as voice mail and auto attendant, which rely on the storage and retrieval or voice data, both locally and across the LAN.

For example, voice mail utilizes the above described functionality as follows. If an outside caller reaches the system through the telephony port 55, their voice signal is digitized (if needed) and converted from synchronous PCM to asynchronous form. The data is then streamed across the PC port 59 to the PC host processor, which typically stores the data in larger buffers holding at least several kilobytes of data. To improve system efficiency, this data is typically compressed, and periodically written to a file on the hard disk for storage. A system user is later able to access the stored voice data, either by calling into the system from the PSTN via the telephony port 55, or from across the LAN port 57. In the latter case, the data can either be streamed across the LAN to the user's station module 30 for direct voice playback to an attached telephone 11, or the file holding compressed voice data can be first transferred to the client PC memory for playback locally through the client PC bus 29 to the station module 30 and then the attached telephone 11.

The user can also leave a message for someone else by transferring voice data through the LAN port 57 to the control processor 58 and then through the PC port 59 for compression and storage as described above.

An alternate implementation would store the voice data file on the client PC 18 hard disk instead of the server 12 disk. Playback could then be across the LAN ultimately to the line interface 52, or locally across the PC bus to the attached station module 30.

Multi-Port PSTN Module Control Logic

Figure 6:
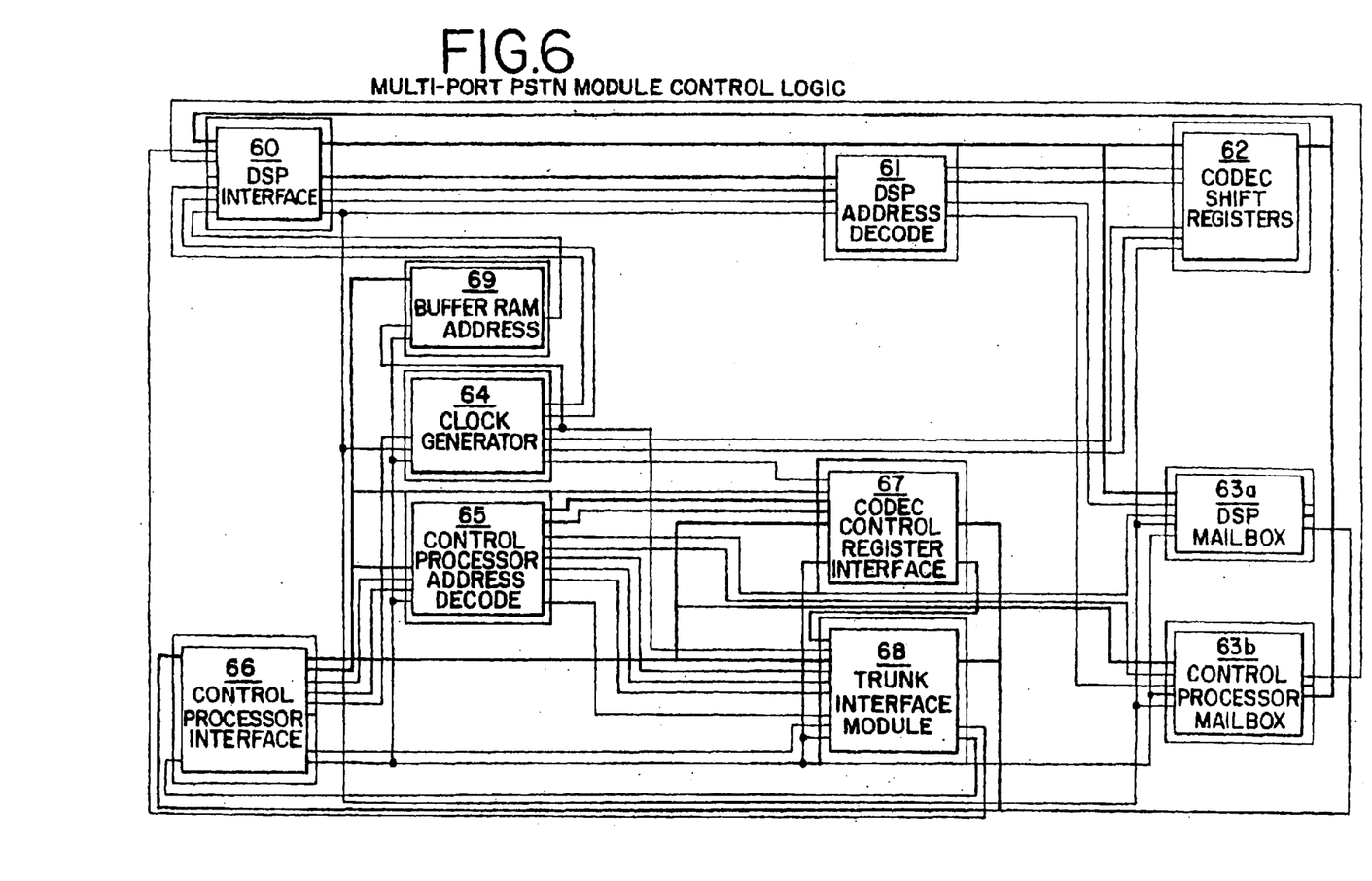
FIG. 6 shows a high level diagram of the control logic of the multi-port PSTN module of FIG. 2.

FIG. 6 shows a block diagram of the control logic for the PSTN module 20 of FIG. 2. In the preferred implementation, operation is as follows during the transmission and reception of voice media streams.

Every 5 milliseconds the control processor 28 (FIG. 2) receives an ATM cell with a 40 byte payload from the network 10. These 40 bytes are transferred to the buffer memory 27 using a unique base address for each channel. The Buffer RAM address logic 69 (FIG. 6) adds an offset to the base address, received from the control processor through the control processor interface 66, to yield the actual transfer address.

Asynchronously to the above, the control processor 27 (FIG. 2) receives an interrupt from the clock generator 64 (FIG. 6) via the control processor interface 66 every 5 mS to indicate that the buffer memory holds 40 bytes of data to be transmitted over the network. The control processor 28 presents a unique base address per channel to which the buffer RAM address logic 69 alternately adds an offset of 0 or 40 before applying the address to the data buffer.

One or more 8 bit CODEC shift registers 62 are daisy chained together to feed the PCM transmit highway. This highway in turn feeds a similar number of CODECs, corresponding to the number of shift registers. In the preferred implementation, 16 shift registers and 16 CODECs are used. The input to the CODEC shift register chain 62 is fed from the PCM receive highway. The CODECs are programmed to access specific time slots within the PCM highway in such a way that at the conclusion of a frame period the shift register which held the transmit data for CODEC n now holds the data received from CODEC n. Associated with each shift register 62 is a holding register and at the conclusion of a frame the contents of each holding register and shift register are exchanged and a DSP interrupt is asserted from the clock generator 64 to the DSP 23 via the DSP interface 60. Upon servicing this interrupt the DSP 23 reads each holding register within the CODEC shift registers 62, and writes the data in each channel's receive buffer RAM 27. It then proceeds to write each register with data from its respective transmit buffer RAM 27. The DSP 23 may manipulate the data as it is transferred in either direction between the holding registers 62 and the buffer RAM 27.

To facilitate the synchronized exchange of control information between the control processor 28 and the DSP 23 a pair of mailboxes 63a and 63b per channel is included. Any write by the control processor 28 to the mailbox 63b causes an interrupt to the DSP 23 via the DSP interface 60. In order to reduce CPU 28 overhead a DSP 23 write to the mailbox 63a does not cause a control processor interrupt but instead the control processor 28 inspects the mailbox 63a every 5 mS during the cell available interrupt raised by the clock generator 64.

The trunk interface module 68 is used by the control processor 28 via the control processor interface 66, in conjunction with the control processor address decode 65, to seize individual trunk lines 17. By a reverse path, the control processor 28 is able to detect the presence of ringing voltage on trunk lines 17.

The DSP address decode logic is used to select individual CODEC shift registers 62 and a particular mailbox 63a or 63b.

CODEC programming from the control processor 28 is via the control processor interface 66 in conjunction with control processor address decode 65 using the CODEC control register interface 67.

The control logic for the multi-port station module 30 operates similar to the control logic for the PSTN module 20 described above, except that the buffer address logic 69 (FIG. 6) function and the buffer RAM 27 (FIG. 2) are now performed within the control processor and its associated RAM. The additional processing overhead is tolerable, since only a few channels are simultaneously active. This results in a lower cost implementation with fewer components. The one other difference is the replacement of the trunk interface module 68 (FIG. 6) with a station interface module, which allows the control processor 38 (FIG. 3) to detect an off-hook condition on the line, to connect battery voltage to the line, and to connect a ringing voltage to the line interconnecting the station module 30 with the telephone 11.

Not shown is the telephony hub control logic 46, which differs from the server control logic 26 only in the replacement of the trunk interface module with a multi-station telephone interface module, with the similar functionality to the single station interface module 78 discussed above.

Server Software

Figure 7:
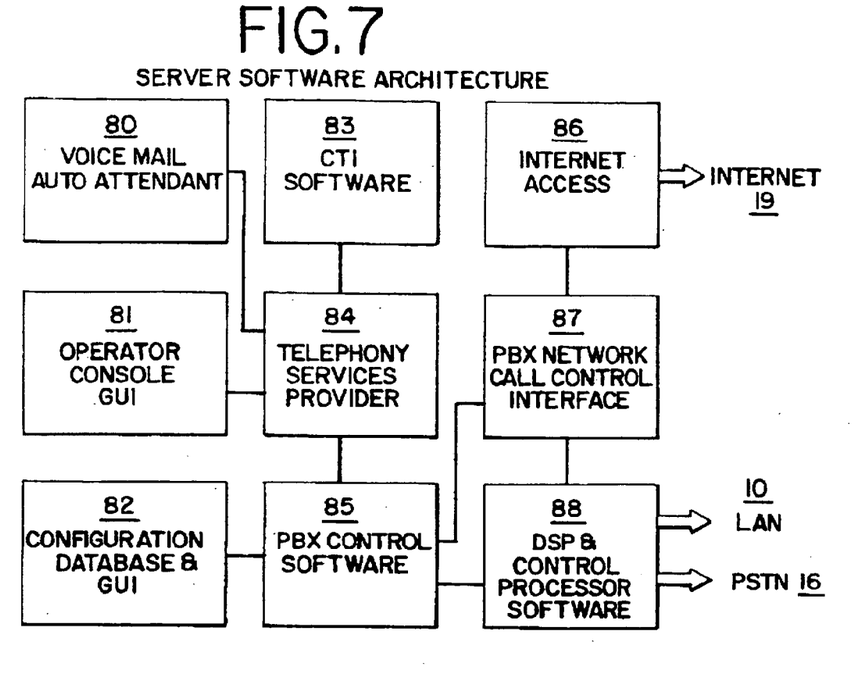
FIG. 7 shows the server software architecture of the telephone network of FIG. 1.

FIG. 7 shows the architecture of the server software. In general, the software is developed using conventional C++ compilers and other software development tools for operating systems such as Microsoft Windows NT, Windows 95 and UNIX. In the preferred embodiment, Microsoft Windows NT is used in the server and Windows 95 or Windows NT is used in the client computer.

The key component running on the server is the PBX control software 85, which manages all telephony resources in the system, including telephones 11 and lines connecting to the PSTN 16 (FIG. 1). The PBX software 85 controls both local trunk connections at the server to trunk lines 17 and other trunk connections or telephone stations in remote server or client computers distributed on the ATM LAN.

Communication between the PBX software 85 and the local PSTN module 20 of FIG. 2 is via the PBX network call control interface 87, a socket-based programming interface that allows messages to be sent and received directly across the server bus 29 (FIG. 2) to the control processor in the module 20, and also to communicate with remote telephony modules via a similar socket-based mechanism that sends messages across the ATM network using a standard protocol such as TCP/IP. This same interface can also be used to send messages across the Internet to control remote telephony resources at any other location also connected to the Internet. Allowance is made for the slower response time of the Internet by using more intelligent client software.

The PBX operation is controlled by data stored in a configuration database 82. This software allows systems administrators to control such functions as telephone extension assignment, trunk line connections, user options such as the number of rings before transfer to voice mail, forwarding, lists of disallowed numbers, and designation of operator extensions. Access to this database is provided by means of GUIs that simplify the task of PBX setup and administration.

Telephony services provider software 84 is interfaced to the PBX software 85. The telephony services provider software 84 incorporates functionality such as that provided by the Microsoft (Redmond Washington) Telephony Applications Programming Interface (TAPI 2.0) and the NOVELL (Orem, Utah) Telephony Server Applications Programming Interface (TSAPI). The service provider makes it possible for software applications to control telephone functions such as initiating and terminating calls, putting calls on hold, transferring, parking and pickup of calls, initiating conference calls, and monitoring calls. It provides a programming interface that simplifies the control of telephony by applications such as voice mail, auto attendant, and the operator console GUI.

Client Software

Figure 8:
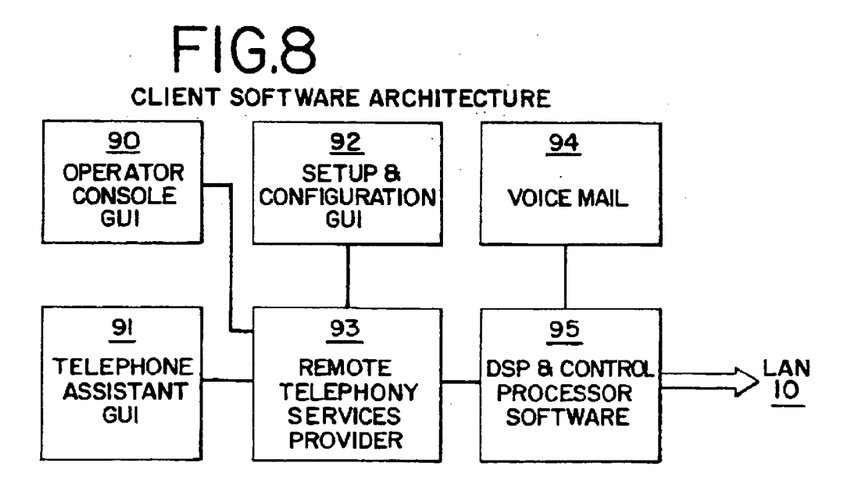
FIG. 8 shows the client software architecture of the telephone network of FIG. 1.

FIG. 8 shows the client software architecture. The control processor software 95 in the client NIC 30 of FIG. 3 uses a socket-based programming interface to send and receive messages from the PBX software in the server, using a protocol such as TCP/IP over the ATM LAN 10 (FIG. 1). The client PC 18 applications use a remote telephony services provider software module 93 to communicate with the telephony service provider 84 on the server 12 (FIG. 1) to gain access to PBX telephony services across the LAN 10. These services are used by applications such as the operator console GUI 90, setup and configuration GUI 92, and a telephone assistant GUI 91, all of which simplify and extend the use of telephony by the client PC operator.

Operator Console and Telephone Assistant GUIs

Figure 9:
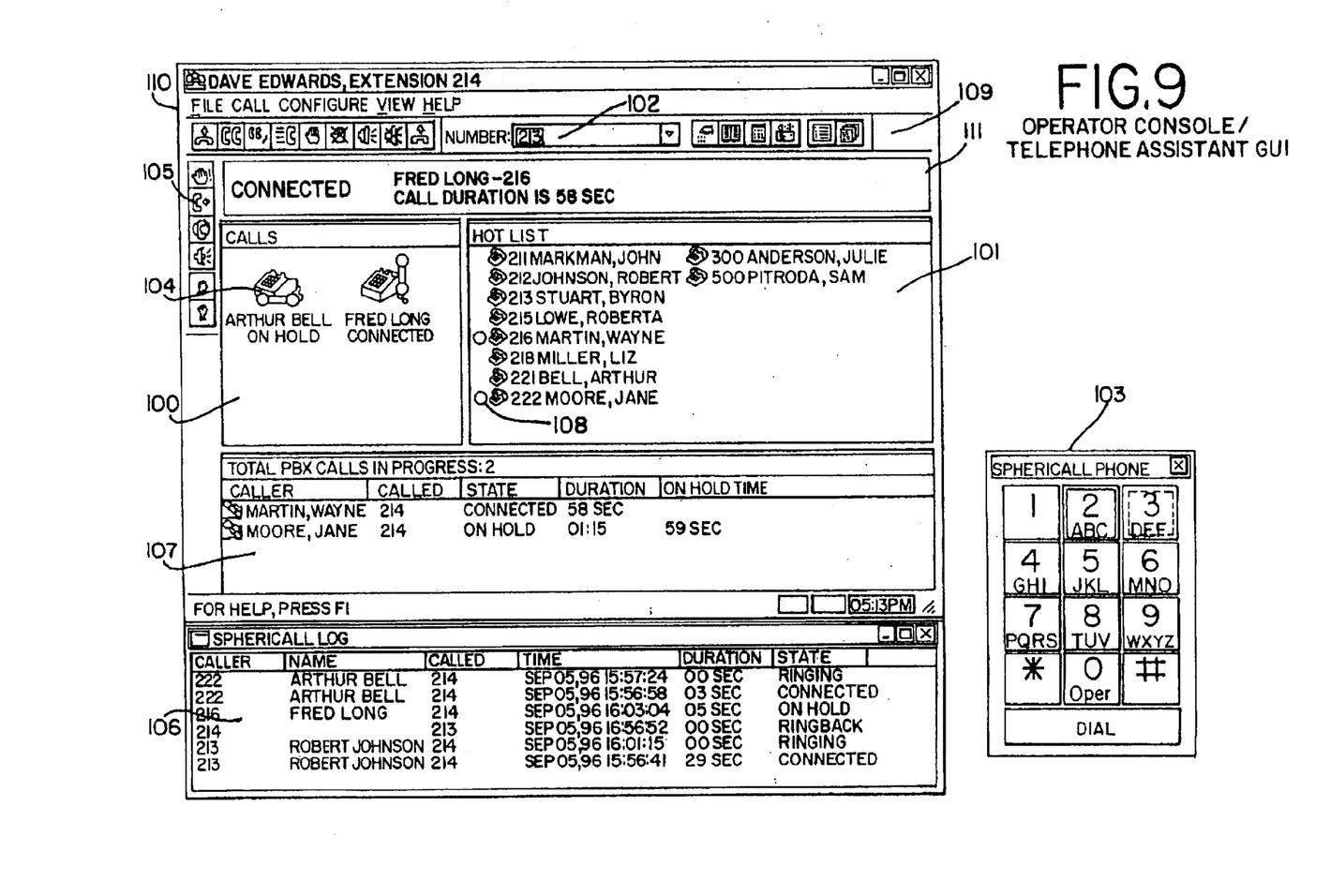
FIG. 9 shows the operator console graphical user interface (GUI).

FIG. 9 shows the operator console GUI, which replaces the conventional multi-button telephone normally used by operators to control and transfer incoming calls with a pop-up Window that facilitates call handling directly from the computer screen. In the following description, the term GUI is used to mean the telephone assistant GUI or the operator console GUI. These two applications have a common method of operation and a common look and feel. The operator console GUI has all the functionality of the telephone assistant GUI, and incorporates additional functionality such as allowing the operator to monitor the status of all PBX lines in the Monitor View, and seeing which other operator consoles are active on the PBX.

The GUI allows a user to manage multiple calls on a given phone line, using such call control options as answer, hang up, hold, unhold, park, pickup, attended transfer and blind transfer.

Calls are presented graphically as icons 104 in the Call View 100, allowing the user to interact with a call using conventional windows mechanisms and mouse operations. A call can be selected and subsequent menu options and toolbar buttons are applied to this call. For example, if an incoming call appears in the Call View 100, the user need only double click the call icon 104 to answer it. If a call is connected, the user can double click an extension in the Hot List 101 to transfer the call. Other call control options are always available through menu 110 and toolbar buttons. Color is used to show the currently selected call: for example, a red icon is used for the selected call, gray icons for all other calls. Different icons are used for different call states. For example, an incoming call which is ringing appears as a flashing telephone icon. A connected call appears as a telephone with the handset off-hook.

For the selected call, the GUI displays additional information in a status pane 111, showing the call's state, call duration, the transferred from extension number, and the name and number of the other party in the call. Where possible, the name of a caller is presented in addition to the caller's number.

User interactions are optimized for convenience and efficiency. For example, with one drag and drop operation a call can be transferred to another extension in the Hot List view 101.

When originating calls, the number can be entered from the keyboard into the data entry field 102, a telephone keypad 103 in the GUI may be used, or the keypad on the telephone 11 itself may be used. In the preferred embodiment, using Microsoft Windows 95 or Windows NT, a number may also be selected from the Microsoft Exchange Phonebook. Numbers of most importance to the user are stored in a Hot List 101. This list is always visible in the GUI and allows the user with a double click of the mouse to initiate a call to one of the numbers. The Hot List can be configured by the user, and contains numbers that may be other extensions or public telephone numbers. In the preferred embodiment, using Microsoft Windows 95 or Windows NT, the user can select numbers from the Microsoft Exchange Phonebook to add to the Hot List. There is no limit to the number of entries in the list.

The list can be used for speed dialing. By simply double clicking an entry in the list, the GUI will dial the number. The list is also used to simplify call control operations. By dragging a call icon from the Call View onto an extension in the Hot List, the user initiates a transfer to that extension.

If the Hot List contains a large number of entries, a text search mechanism allows the user to quickly locate an entry, using the data entry field 102. For example, an operator may configure the list to contain all of the extensions on the PBX. Given a person's name, the operator enters the first few characters of the name and the GUI locates the list entry, scrolls it into view and selects it for the operator. Entries in the Hot List can be expanded to show additional numbers. For example, an entry called "Company" could be expanded via a mouse click to show all the departments, which in turn could be expanded to show individual extensions. Using this hierarchical scheme, the actual number of visible entries can be kept to a minimum.

For incoming calls, the user can command the GUI to process the call. With a single press of a button 105, the GUI will answer a call, play a recorded message and put the call on hold or transfer it to voice mail. The user can perform this operation while continuing a conversation on another call. This single button call handling simplifies operation when more than one call is presented to the user.

The GUI is designed to run in the background. If the user receives a call, it pops up in front-of any other application running. At any time if the user wants to initiate a call, double clicking an icon on the desktop brings the GUI to the front.

The GUI reflects direct use of the telephone handset for call control. For example, if the user lifts the phone's handset to initiate a call, the GUI will show the new call icon similar to 104 on the screen. The two methods of call control can be used together on the same call. For example, the user can pick up the handset to pull dial tone and then use the GUI to dial a number.

A Call Log 106 is maintained showing all incoming and outgoing calls on the user's line. Calls are logged regardless of their outcome. For example, an incoming call which is not answered is still logged, so that the caller ID information can be viewed later.

The operator console GUI provides a Monitoring View 107 showing the state of all current calls on the PBX. This view is maintained in real time, reflecting a change in a call's state as it happens. An activity icon 108 is also shown in the Hot List next to each party involved in a monitored call.

For each call, the operator can see the calling party, the called party, the state of the call (e.g. connected, on hold, ringing), the duration of the call if connected, and if the call is on hold, how long it has been on hold. Each party involved in a call is marked with an activity icon 108 in the Hot List 101. The operator may also select a Hot List entry and monitor just that number in a separate window not The GUI provides a telephony service to other applications running on the desktop. In the preferred embodiment, running under Microsoft Windows 95 or Windows NT, the GUI supports drag and drop, automatically dialing when the user drops a number on the GUI's window. The GUI also acts as an OLE Automation Server, allowing other Automation Clients such as Microsoft Word, Excel and Access to command the GUI to place calls. This OLE automation interface permits the client to exercise full call control, not only call initiation.

Network Operation

We now examine how the network operates to implement typical telephony operations. First, we will examine how a call is placed across the LAN. This discussion will focus on the use of the telephone to make and receive calls. Telephone calls can also be made and received using the operator and telephone assistant GUIs under the control of the client computer user. The operation is the same as described below, except that dialing and call pickup can be initiated directly from the computer by applications software accessing PBX services through the network telephony services provider 84 (FIG. 7). This also provides the user with additional information and control options, as described in the previous section discussing GUI features and operation.

When the user wishes to make a call, the telephone receiver 11 (FIG. 1) is taken off-hook. This event is recognized by the multi-port station module control processor 38 (FIG. 3) through its telephony interface circuit 32 and control logic 36, and a message is sent across the LAN 10 to the PBX software 85 (FIG. 7) in the server. The PBX examines the PBX configuration database 82, and if appropriate, instructs the client NIC via a message across the LAN 10 to transmit dial tone from the digital signal processor 33 through the telephony interface 32 to the telephone 11. When the user dials the telephone 11 by depressing the keys with the number of the extension to connect, standard DTMF tones are transmitted through the station interface 32 on the station module 30 and detected by the digital signal processor 33. The codes are read by the control processor 38, and messages are sent across the LAN to the PBX software 85 in the server 12 via the ATM interface 34. The PBX software compares the extension number to a stored table of valid extensions, and if found, sends a id message to the target client PC 18 instructing that station module 30 to ring its attached telephone 11 using the telephone interface circuit 32. When the target user goes off-hook, that event is detected by the target control processor 38, which sends an appropriate message to the PBX software 85 across the LAN. The PBX software 85 then sends a message to both the initiating and multi-port station module control processors 38, instructing them to establish a bi-directional media stream through the LAN so that voice communication becomes possible.

At this time, analog voice signals from the microphone in the telephone 11 receiver pass through the telephone station interface 32 which contains a standard CODEC. Data samples are transferred by the control logic 36 from the CODEC to the digital signal processor 33 and control processor 38. There voice data is accumulated in local control processor 38 memory until enough data for one ATM cell is accumulated, plus additional data to allow for network jitter. One cell's data is then transferred to the ATM interface 34, and an ATM cell is transmitted across the LAN 10 to the target station module. There, the cell's data is moved from the ATM interface 34 to control processor 38 memory. The data is sent to the digital signal processor 33 and passed to the target CODEC at the same 8000 sample per second rate, one byte at a time, and converted back to analog form for transmission to the attached earphone in the target telephone 11.

A reverse transmission path is also established so that bi-directional communication is possible. When one caller hangs up, the local station module 30 interface 32 and control logic 36 detects this, the event is recognized by the local control processor 38, and a message is sent across the LAN 10 to the PBX software 85 in the server 12, which in turn notifies both multi-port modules to terminate the connection.

Making a call to an outside line is similar. Again, when the user wishes to make a call, the telephone receiver 11 is take off-hook. This event is recognized by the client NIC control processor 38 through its telephony interface circuit 32, control logic 36 and control processor 38, and a message is sent across the LAN 10 to the PBX software 85 in the server. The PBX typically instructs the client NIC via a message across the LAN to transmit dial tone from the digital signal processor 33 through the telephony interface 32 to the telephone 11. When the user dials the telephone 11 by depressing the 9 key, a standard DTMF tone combination is transmitted through the station interface 32 on the station module 30 and detected by the digital signal processor 33. This code is read by the control processor 38, and a message is sent across the LAN to the PBX software 85 in the server 12. The digit 9 is typically used to signify an outside call. On receiving this, the PBX software 85 examines the state of PSTN module 20 and takes the first available line found off-hook by sending an appropriate message to the control processor 28 across the local PC bus 29. The PBX software 85 then sends a message to both the initiating multi-port station module and multi-port PSTN module control processors 28 and 38 respectively, instructing them to establish a bi-directional media stream. The message to the station module 30 is sent across the LAN 10 using a standard protocol such as TCP/IP, and the message to the PSTN module is sent directly across the server PC bus 29 to the multi-port PSTN module control processor 28. The user waits for outside dial tone, and then dials the desired telephone number.

At this time, analog DTMF dialing signals from the client telephone 11 pass through the telephone station interface 32 which contains a standard CODEC. This circuit changes the analog voice signal into digital form. Data samples are transferred by the control hardware to the digital signal processor 33. There voice data is accumulated in control processor 38 RAM until there is sufficient data for one ATM cell, plus additional data to help overcome timing uncertainties (jitter) inherent in cell transmission across the asynchronous LAN. One cell's data is then transferred to the control processor 38 and subsequently the ATM interface 34, and a cell is transmitted across the LAN to the PSTN module 20. There, the cell is moved from the ATM interface 24 by the control processor 28 and control logic 26 to the buffer RAM 27 where it is stored. This circuit is more complex than in the client so that the PSTN module 20 can efficiently handle 16 or more bi-directional voice channels without significant loss in performance. The data is taken from the buffer RAM 27 by the control hardware 26 and passed to the target CODEC in the trunk interface 22 one byte at a time, and converted back to analog form for transmission to the attached telephone trunk line 17.

A reverse transmission path is also established so that bi-directional communication is possible. The client telephone then behaves as a normal telephone that is connected directly to the outside line. When the caller hangs up, the station module 30 interface detects this, the event is recognized by the local control processor 38, and a message is sent across the LAN 10 to the PBX software 85 in the server 12, which in turn notifies both the client 30 and network 20 modules to terminate the call and make the trunk line available for other users.

An incoming call is handled in similar manner. Ringing is detected by the PSTN module 20 using the line interface 22 and control logic 26, and the control processor 28 reports this event to the PBX software 85. Control processor 28 takes the trunk line interface 22 off-hook when instructed to do so by the PBX software. Incoming analog signals are digitized in a CODEC in the PSTN module 20 telephone trunk interface circuit 22 as discussed above, and passed to the digital signal processor which performs caller ID detection and DTMF detection. Typically, the telephone line management is placed under the control of auto attendant application software, which plays suitable voice messages prompting the user to enter the desired extension number using the DTMF keypad on the telephone. This message is played from digitized speech stored typically on the server hard disk. The digital signal processor 23 intercepts the DTMF digits and passes the decoded information to the PSTN module 20 control processor 28, which notifies the PBX 85 via a message sent across the server bus 29 to the server main processor which is executing the PBX software 85. If a valid extension has been detected, the PBX instructs the appropriate station module 30 to ring its attached telephone 11. If the telephone is answered, that event is detected by the station module 30 control processor 38 and a message is sent to the PBX software 85 in the server 12, which in turn responds by instructing the PSTN module 20 and the station module 30 to set up bi-directional media streams so that voice communication becomes possible.

If either caller hangs up, this is detected by the appropriate multi-port module control processor, either directly in the station module 30 or indirectly in the PSTN module 20, for example by detecting the reappearance of dial tone on the trunk line, by using the digital signal processor 23 call progress detection algorithms.

The architecture of the ATM LAN telephony system confers several advantages.
1. There is no duplicate building wiring required for users with both LAN and telephone connections.
2. The system is inherently lower in cost, since it leverages computing power already available on the LAN.
3. Software integration between computer applications and telephony call processing is more effective, since both operate over the same network on the same computers. Communication between the two requires only software messaging using standard protocols rather that functionally constrained interfaces between incompatible building blocks.
4. The underlying multi-port modules 20 and 30 support both telephone call processing and voice processing. Consequently, every telephony station or line interface is capable of supporting voice processing applications such as voice mail. This is in contrast with existing systems, where common practice separates the PBX function from the voice processing function, frequently into separate systems with only a limited number of voice access ports. This performance bottleneck is avoided by the architecture described here.
5. The broad range of functionality of the modules 20 and 30 makes it possible to add functions such as voice mail as pure software applications.
1. The system is easy to use with user friendly GUIs.
2. Unified maintenance and administration are performed within the LAN for both voice and data.
1. Easy expandability with no hard limit to system capacity.
2. A large campus network can be set up by interconnecting individual workgroups, each of which has a LAN PBX system using ATM connections between ATM switches.

It is to be understood that both the foregoing general description and the following detailed description are exemplary and explanatory and are intended to provide further explanation of the invention as claimed. For example, networking technologies other than ATM that can support guaranteed quality of service support for real time voice traffic. An alternate topology uses ATM exclusively for networking voice in parallel with an existing Ethernet LAN. In such a configuration, a telephony hub could be directly connected to the communications server, which also incorporates an Ethernet interface for data connection to the existing Ethernet LAN. Only when the number of required telephone stations is increased does the use of an ATM switching device become necessary.

In addition, digital telephone sets could be so used by incorporating an appropriate digital interface such as the standard Universal Serial Bus (USB) interface. Digital line interfaces such as T1 and SONET could be used for trunk connection instead of analog interfaces. Numerous other modifications and variations are also possible. Accordingly, it is intended that the foregoing detailed description be regarded as illustrative rather than limiting. It is the following claims, including all equivalents, which are intended to define the scope of this invention.

We claim:

1. A private branch exchange (PBX) for servicing telephone calls between internal telephones and providing outside lines to the public telephone system for said internal telephones, the PBX comprising:
   a computer data network having quality of service (QoS) including a server, client workstations, network cabling and a network operating system that enables data exchange between said server and said client workstations;
   an interface to the public telephone system that converts voice, modem and tone transmissions from the public telephone system to asynchronous data transmissions and vice versa, wherein said interface is coupled to said computer data network;
   a plurality of internal telephones each of which is connected to said network cabling by means of a station interface and each of which is associated with a separate one of said client workstations;
   call control programming installed on said computer data network that manages transmission of data over said network cabling between pairs of said plurality of internal telephones and manages transmission over said network cabling of data between each of said plurality of telephones and the interface to the public telephone network; and
   wherein said call control programming further provides a graphical user interface on each of said client workstations to which one of said plurality of telephones is associated, wherein said graphical user interface provides for at least one of answering and initiating telephone calls on the one of the plurality of telephones with which said client workstation is associated by operating a mouse or equivalent pointing device in conjunction with said graphical user interface.

2. The invention of claim 1 wherein said computer data network is an ATM network.

3. The invention of claim 1 further comprising an ATM switch for routing telephony traffic.

4. The invention of claim 1 wherein said computer data network is an ethernet network.

5. The invention of claim 1 wherein said computer data network is a cells in frames ethernet network.

6. The invention of claim 1 wherein said computer data network is an internet protocol (IP) over ATM network.

7. A private branch exchange (PBX) for servicing internal telephone calls among telephone devices and providing telephone access to the public telephone system, the PBX comprising:
   a computer data network providing quality of service (QoS), and a plurality of computer workstations operatively coupled together via said computer data network;
   a first interface means between the public telephone system and said computer data network that converts at least one of voice, modem and tone transmissions from the public telephone system to data streams for transmission over said computer data network, and vice versa;

a plurality of telephone means each of which is connected to said computer data network via a respective one of said computer workstations;

second interface means for connecting said plurality of computer workstations to said computer network for translating voice signals at said telephone means to a data stream for transmission over said computer data network, and vice versa; and telephone call control programming installed on said computer data network wherein said call control programming comprises a PBX manager program that detects an input by one of said plurality of telephone means, and, upon said detection, transmits data in packets over said computer data network from said second interface means to said first interface and vice versa to provide an outside line from the public telephone system to the telephone means.

8. The private branch exchange according to claim 7, wherein said telephone call control programming implements voice storage.

9. The private branch exchange according to claim 7, wherein said telephone call control programming implements voice mail.

10. The private branch exchange according to claim 7, wherein said telephone call control programming implements auto attendant.

11. The private branch exchange according to claim 7, wherein said telephone call control programming implements an interactive voice response.

12. The private branch exchange according to claim 7, wherein said telephone call control programming implements fax transmission.

13. The private branch exchange according to claim 7, wherein said telephone call control programming controls states and interconnections of a number of second interface means.

14. The private branch exchange according to claim 7, wherein each second interface adapter comprises a synchronous to asynchronous data converter.

15. The private branch exchange according to claim 7, wherein each second interface adapter comprises a CODEC.

* * * * *